Patented Feb. 18, 1947

2,416,151

UNITED STATES PATENT OFFICE 2,416,151

PRODUCTION OF CELLULOSIC MATERIALS WITH IMPROVED CREASE-RESISTING PROPERTIES

John Boulton, Bocking, Braintree, England, assignor to Courtaulds Limited, London, England, a British company No Drawing. Application November 26, 1943, Serial No. 511,866. In Great Britain December 21, 1942

5 Claims. (Cl. 117—139.4)

It has been proposed to impregnate cellulosic material with a water-soluble intermediate product in the first stage of condensation from formaldehyde and urea or thiourea and then carry the product to the final stage of condensation by the addition of an acid, or an acid salt, in the presence of heat. It has also been proposed to improve the crease-resisting properties of cellulosic material by impregnating the material with a solution made from formaldehyde and urea or thiourea and containing an acid catalyst such as boric acid under such conditions that the intermediate product is distributed within and substantially not between the individual fibres and then heating the material to convert the intermediate product into the final insoluble product or synthetic resin.

I have now found that improved results can be obtained in the production of cellulosic materials with improved crease-resisting properties by impregnating the material with a solution containing formaldehyde and urea or thiourea, or a water-soluble intermediate product obtained from these compounds, together with an acid catalyst consisting of a mixture of boric acid and a hydroxy aliphatic acid, such as tartaric acid and lactic acid and then heating the material to bring about the conversion of the water-soluble intermediate product into an insoluble condensation product. By this method improvements are obtained over a similar process in which either tartaric acid or lactic acid alone is used as the catalyst, in that the impregnating liquor containing boro-tartaric acid, or boro-lactic acid, remains clear for a longer time, that is without precipitation of the insoluble compound commencing, as compared with the corresponding solutions containing tartaric acid or lactic acid in the absence of boric acid, and moreover there is less loss of tensile strength of the material so treated.

When carrying out the process of this invention a small proportion of a diarylguanidine may also be added to the impregnating mixture as indicated in the specification of British Letters Patent No. 546,122.

The following example will serve to illustrate the nature of this invention, which, however, is not limited to this example. The parts are by weight.

Example

Two solutions are prepared as follows:

Solution A.—5000 parts of neutral 40 per cent formaldehyde solution and 2160 parts of urea are mixed together, caustic soda is added until the mixture has a pH of 9 to 9.5 and the whole heated for four minutes at the boil, or 10 minutes at 80° centigrade, cooled rapidly and the solution A obtained by dissolving 40 parts of this precondensate mixture in 40 parts of water.

Solution B.—0.16 part of boric acid and 0.52 part of 50 per cent lactic acid are dissolved in 20 parts of water.

Solution B is stirred into solution A and the mixture used immediately to impregnate a poplinette made entirely from viscose staple fibre and having a weight of about 4 ounces per square yard. The impregnation is carried out on a pad mangle and the fabric is then dried immediately at from 60° to 90° centigrade and then heated for from 5 to 10 minutes at from 135° to 140° centigrade. The fabric is washed for 10 minutes at 50° centigrade in a solution containing 0.25 per cent of soap and 0.25 per cent of ammonia, then rinsed, squeezed and dried. The fabric thus obtained possesses a good crease-resistance.

In the above example solution B can be replaced by a solution containing 0.12 part of boric acid and 0.28 part of tartaric acid in 20 parts of water and a similarly good crease-resistance be obtained.

What I claim is:

1. An improved process for imparting crease-resisting properties to cellulosic textile materials which comprises mixing two solutions, namely, a first solution selected from a group consisting of a mixture of urea and formaldehyde and a mixture of thiourea and formaldehyde, with a second solution containing an acid catalyst consisting of a mixture of boric acid and an aliphatic hydroxycarboxylic acid selected from a group consisting of lactic acid and tartaric acid, immediately impregnating the material with the mixture of said first and second solutions, and thereafter subjecting the impregnated material to the action of heat to convert the water-soluble product into the insoluble condensation product.

2. A process as claimed in claim 1 in which the aliphatic hydroxycarboxylic acid used is lactic acid.

3. A process as claimed in claim 1 in which the aliphatic hydroxycarboxylic acid used is tartaric acid.

4. An improved process for imparting crease resisting properties to cellulosic textile materials which comprises mixing two solutions, namely, a first solution selected from a group consisting of a mixture of urea and formaldehyde and a mixture of thiourea and formaldehyde, with a second solution prepared by dissolving about 0.12 part of boric acid and about 0.28 of tartaric acid in twenty parts of water, immediately impregnating the material therewith, immediately drying the fabric at from 60° to 90° C., and then heating the fabric for from five to ten minutes at from 135° to 140° C., washing the fabric for about ten minutes at about 50° C. in a solution containing 0.25% soap and 0.25% ammonia, rinsing, and drying.

5. An improved process for imparting crease-resisting properties to cellulosic textile materials which comprises mixing two solutions, namely, a first solution selected from a group consisting of a mixture of urea and formaldehyde and a mixture of thiourea and formaldehyde, with a second solution prepared by dissolving about 0.16 part of boric acid and about 0.52 part of 50% lactic acid in twenty parts of water, immediately impregnating the material therewith, immediately drying the fabric at from 60° to 90° C., and then heating the fabric for from five to ten minutes at from 135° to 140° C., washing the fabric for about ten minutes at about 50° C. in a solution containing 0.25% soap and 0.25% ammonia, rinsing, and drying.

JOHN BOULTON.

REFERENCES CITED

The following references are of record in the file of this patent:

UNITED STATES PATENTS

| Number | Name | Date |
| --- | --- | --- |
| 2,093,651 | Widmer | Sept. 21, 1937 |
| 2,219,375 | Widmer et al. | Oct. 29, 1940 |
| 1,905,999 | Ellis | Apr. 25, 1933 |

FOREIGN PATENTS

| Number | Country | Date |
| --- | --- | --- |
| 291,473 | British | 1927 |
| 437,441 | British | Oct. 25, 1935 |
| 456,307 | British | Nov. 6, 1936 |
| 457,659 | British | Nov. 30, 1936 |